(12) United States Patent
Frens et al.

(10) Patent No.: US 10,300,848 B2
(45) Date of Patent: May 28, 2019

(54) VARIABLE LIGHT INDICATOR

(71) Applicant: JOHNSON CONTROLS TECHNOLOGY COMPANY, Holland, MI (US)

(72) Inventors: Jonathan Frens, Hudsonville, MI (US); Scott Meyers, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/426,959

(22) PCT Filed: Sep. 9, 2013

(86) PCT No.: PCT/US2013/058799
§ 371 (c)(1),
(2) Date: Mar. 9, 2015

(87) PCT Pub. No.: WO2014/039992
PCT Pub. Date: Mar. 13, 2014

(65) Prior Publication Data
US 2015/0217684 A1 Aug. 6, 2015

Related U.S. Application Data

(60) Provisional application No. 61/699,019, filed on Sep. 10, 2012.

(51) Int. Cl.
*B60Q 3/14* (2017.01)
*B60Q 3/80* (2017.01)
(Continued)

(52) U.S. Cl.
CPC ............... *B60Q 3/80* (2017.02); *B60K 37/02* (2013.01); *B60Q 3/14* (2017.02); *G01D 11/28* (2013.01);
(Continued)

(58) Field of Classification Search
CPC ............ B60K 2350/2008; B60K 37/02; B60Q 3/0293; B60Q 3/044; G01D 11/28
(Continued)

(56) References Cited

U.S. PATENT DOCUMENTS 5,815,072 A * 9/1998 Yamanaka ............. B60K 35/00
340/438
6,189,480 B1 * 2/2001 Staley .................... G01D 11/28
116/288
(Continued)

FOREIGN PATENT DOCUMENTS

FR 2939208 * 6/2010 ......... B60H 1/00985
FR 2939208 A1 6/2010
(Continued)

OTHER PUBLICATIONS

English Abstract and English Machine Translation of FR2939208 from Espacenet.*
(Continued)

*Primary Examiner* — Zheng Song
(74) *Attorney, Agent, or Firm* — Quinn IP Law (57) ABSTRACT

An indicator assembly is disclosed having a first light source and a second light source positioned relative to a surface. An overlap region may be formed between the first light source and second light source depending upon the relative intensity of the light sources, which may be used to convey information to a user and/or to provide an alternative visual indicator of a gauge.

44 Claims, 8 Drawing Sheets

(51) Int. Cl.
*G01D 11/28* (2006.01)
*B60K 37/02* (2006.01)

(52) U.S. Cl.
CPC ............... *B60K 2350/2008* (2013.01); *B60K 2350/403* (2013.01)

(58) Field of Classification Search
USPC .............. 362/23.17, 23.08, 23.09, 23.1, 362/23.01–23.22
See application file for complete search history.

(56) References Cited

U.S. PATENT DOCUMENTS

| | | | |
|---|---|---|---|
| 6,450,656 B1* | 9/2002 | Noll | B60Q 3/044 362/23.15 |
| 7,374,323 B1* | 5/2008 | Kelman | B60Q 3/004 116/228 |
| 7,501,939 B1 | 3/2009 | Belikov et al. | |
| 2006/0285308 A1* | 12/2006 | Birman | B60K 35/00 362/23.15 |
| 2009/0091911 A1* | 4/2009 | Perez | B60Q 3/004 362/23.18 |
| 2010/0083894 A1* | 4/2010 | Birman | G01D 11/28 116/288 |
| 2011/0044046 A1* | 2/2011 | Abu-Ageel | F21K 9/00 362/259 |
| 2011/0051393 A1* | 3/2011 | Ishikawa | G01D 11/28 362/23.19 |
| 2014/0182508 A1* | 7/2014 | Oishi | B60K 37/02 116/62.3 |

FOREIGN PATENT DOCUMENTS

| | | |
|---|---|---|
| JP | H05-113760 A | 5/1993 |
| JP | 2004-517312 A | 6/2004 |
| JP | 2009-544044 A | 12/2009 |
| JP | 2011-027882 A | 2/2011 |
| JP | 2012-026759 A | 2/2012 |
| WO | WO-2010/042107 A1 | 4/2010 |

OTHER PUBLICATIONS

English Abstract and English Machine Translation of Guerreiro Pierre FR2939208 (Date: Jun. 2010) from Espacenet (Year: 2010).*
International Search Report dated Feb. 5, 2014 in PCT/US2013/058799, 4 pages.
International Preliminary Report on Patentability and Written Opinion of the International Searching Authority dated Mar. 19, 2015, in PCT/US2013/058799, 8 pages.
Office Action dated Aug. 15, 2017, in corresponding Japanese application No. 2015-531296, 4 pages.

* cited by examiner

VARIABLE LIGHT INDICATOR

CROSS REFERENCE TO RELATED APPLICATIONS

The present application is a U.S. National Stage of International Application No. PCT/US2013/058799 filed on Sep. 9, 2013, which claims the benefit of U.S. Provisional Patent Application No. 61/699,019 filed on Sep. 10, 2012, the entire disclosures of all of which are incorporated herein by reference.

BACKGROUND

The present disclosure generally relates to the field of vehicle indicators.

In a vehicle, an instrument panel may use mechanical gauges or pointers to convey information to a user. The gauges may relate to, for example, vehicle performance (e.g., the speed of the vehicle, rotation speed of the engine (RPM), the percentage of fuel left in the tank, etc.). Pointers may move relative to a display surface (e.g., having hash marks, numerical indicia, etc.). In some instrument panels or other vehicle displays, the pointer and/or the display panel can be illuminated. In other contexts, other gauges may be used to provide information as well. For example, a temperature gauge may be used to provide information about the temperature of one or more objects. A pressure gauge may be used to provide information about the pressure within a container or object. Still other gauges may be used in other contexts.

SUMMARY

One embodiment of the present disclosure relates to an apparatus for visual indication. The apparatus includes a surface, a first light source positioned along the surface at a first location, and a second light source positioned along the surface at a second location.

The first light source and the second light source may be operable to indicate at least one of a rotation rate, a speed rate, a tachometer, a speedometer, a downloading rate, an upload rate, a signal strength, a charging rate, a charging status, a fuel level, a fuel consumption rate, a fuel efficiency, a temperature, an air conditioner temperature setting, a fan speed, a transmission temperature, a battery charging rate, a battery discharging rate, a battery charge level, a tire pressure, a tire temperature, an oil level, an oil temperature, an oil purity, a temperature of a glow plug, an engine temperature, a differential temperature, a seat temperature, a cruise control speed, an acceleration rate, an adaptive cruise control speed, a traction control status, a differential status, a shift efficiency, a door status, a door position, a gas door position, a window status, a window position, a moon roof status, a moon roof position, a convertible top status, a convertible top position, a lift gate status, a lift gate position, a washer fluid level, a transmission fluid level, a distance-to-empty, an incline position, an incline rate of change, a body roll rate, a body roll position, a lateral acceleration, a turbo temperature, a turbo pressure, a turbo speed, a turbo boost, a radio station, a preset, a balance, a vent position, a distance to an object, a back up sensor indicator, a blind spot indicator, a lane departure indicator, a Bluetooth® status, a Bluetooth® signal strength, a cupholder temperature, a cupholder temperature setting, a compartment temperature, a compartment temperature setting, a windshield wiper rate, a sideview mirror position, a parking brake status, a brake temperature, a brake disc status, a tire wear status, a compass direction, a headlight status, a blinker status, a trunk position, a hood position, an air recycle status, a time, a sun position, a navigation indicator, a media item status, a media selection, a brake rate, a volume, a fuel filter status, an oil filter status, an air filter status, a brake fluid status, a brake fluid temperature, a supercharger status, a supercharger boost, a compression ratio, a spring damper status, a radiator fluid level, an ignition timing, a fuel-air mixture, a light intensity, a fuel economy level, a transmission gear, a clutch position, a clutch wear status, a lap time, a relative time, a heart rate, a breathing rate, a body temperature, a button selection, a training status, an exterior noise level, a propeller pitch, a propeller speed, an altitude, a control surface position, a rate of climb, and a rate of descent.

An apparatus for visual indication may include a surface having a first end and a second end. The apparatus may further include a first light source associated with the first end; and a second light source associated with the second end. The first light source illuminates a first portion of the surface when the first light source is at a first intensity and the second light source illuminates a second portion of the surface when the second light source is at a second intensity. The first light source may have a first light color and the second light source has a second light color, wherein the first light color and the second light color are different.

An apparatus for visual indication includes a transparent surface having a first end, a second end, and a plurality of indicators; a first light source associated with the first end; and a second light source associated with the second end. The first light source illuminates a first portion of the plurality of indicators when the first light source is at a first intensity and the second light source illuminates a second portion of the plurality of indicators when the second light source is at a second intensity. At least one of the indicators of the plurality of indicators is illuminated by both the first light source and second light source. The first light source has a first light color and the second light source has a second light color, wherein the first light color and the second light color are different.

A method of visual indication using a system comprising a surface, a first light source associated with a first portion of the surface, and a second light source associated with a second portion of the surface, wherein the first light source has a first light color, and wherein the second light source has a second light color. The method includes activating the first light source at a first intensity level and the second light source at a third intensity level. The method also includes decreasing a first intensity of the first light source from the first intensity level to a second intensity level; and increasing a second intensity of the second light source from the third intensity level to a fourth intensity level. The steps of decreasing a first intensity of the first light source and increasing a second intensity of the second light source may be in response to a movement of an indicator associated with the system. The first intensity level may be a maximum intensity level for the first light source, and wherein the second intensity level may be a minimum intensity level for the first light source. The third intensity level may be a minimum intensity level for the second light source, and wherein the fourth intensity level may be a maximum intensity level for the second light source. The first light color and the second light color may be different. The first light source at the first intensity level and the second light source at the third intensity level define an overlap region, wherein the overlap region is defined by a third light color, wherein the third light color is different than the first light color and the second light color. The first light source at the first intensity level and the second light source at the third intensity level define an overlap region located substantially near the second light source. The first light source at the second intensity level and the second light source at the fourth intensity level may define an overlap region located substantially near the first light source. The first light source at the second intensity level and the second light source at the fourth intensity level may define an overlap region located substantially near the first light source. The first light source at the first intensity level and the second light source at the fourth intensity level may define an overlap region located substantially equidistant between the first light source and the second light source. The first intensity level may have a first maximum intensity level for the first light source, wherein the second intensity level may have a first minimum intensity level for the first light source, wherein the third intensity level may have a second minimum intensity level for the second light source, wherein the fourth intensity level may have a second maximum intensity level for the second light source. The method may further include rapidly increasing the first light source from the first minimum intensity level to the first maximum intensity level and rapidly decreasing the second light source from the second maximum intensity level to the second minimum intensity level; decreasing the first intensity level from the first maximum intensity level to the first minimum intensity level; and increasing the third intensity level from the second minimum intensity level to the second maximum intensity level.

An apparatus for a control panel includes a surface having a first end and a second end; a first light source associated with the first end; and a second light source associated with the second end; wherein the first light source illuminates a first portion of the surface when the first light source is at a first intensity level and the second light source illuminates a second portion of the surface when the second light source is at a second intensity level; wherein the first light source has a first light color and the second light source has a second light color, wherein the first light color and the second light color are different; wherein the first portion has a first size and the second portion has a second size, wherein the first size and the second size define a ratio, wherein the ratio is associated with a control of the control panel. The ratio may be associated with a status of the control of the control panel. The ratio may be associated with a position of an object controlled by the control of the control panel. The ratio may be associated with a characteristic of an object controlled by the control of the control panel.

Another embodiment of the present disclosure relates to an apparatus for visual indication. The apparatus includes a surface having a first end and a second end. The apparatus further includes a first light source associated with the first end and a second light source associated with the second end. The first light source illuminates a first portion of the surface when the first light source is at a first intensity and the second light source illuminates a second portion of the surface when the second light source is at a second intensity.

Another embodiment relates to an apparatus for visual indication. The apparatus includes a transparent surface having a first end, a second end, and a plurality of indicators. The apparatus further includes a first light source associated with the first end and a second light source associated with the second end. The first light source illuminates a first portion of the plurality of indicators when the first light source is at a first intensity and the second light source illuminates a second portion of the plurality of indicators when the second light source is at a second intensity.

Another embodiment relates to a method of visual indication. The method uses a system having a surface, a first light source associated with a first portion of the surface, and a second light source associated with a second portion of the surface. The first light source has a first light color and the second light source has a second light color. The method includes activating the first light source at a first intensity level and the second light source at a third intensity level. The method further includes decreasing a first intensity of the first light source from the first intensity level to a second intensity level, and increasing a second intensity of the second light source from the third intensity level to a fourth intensity level.

Another embodiment relates to an apparatus for a control panel. The apparatus includes a surface having a first end and a second end, a first light source associated with the first end, and a second light source associated with the second end. The first light source illuminates a first portion of the surface when the first light source is at a first intensity level and the second light source illuminates a second portion of the surface when the second light source is at a second intensity level. The first light source has a first light color and the second light source has a second light color. The first light color and the second light color are different. The first portion has a first size and the second portion may has second size such that the first size and the second size define a ratio. The ratio is associated with a control of the control panel.

Another embodiment of the present disclosure relates to an apparatus for visual indication. The apparatus includes a first surface and a second surface. The apparatus further includes a first light source position along the first surface at a first location, a second light source positioned along the first surface at a second location, and a third light source positioned along the second surface at a third location.

Another embodiment of the present disclosure relates to an apparatus for visual indication. The apparatus includes a first surface, second surface, and third surface. The apparatus further includes a first light source positioned along the first surface, a second light source positioned along the second surface, and a third light source positioned along the third surface.

Another embodiment of the present disclosure relates to an apparatus for visual indication. The apparatus includes a first surface, second surface, third surface, and fourth surface. The apparatus further includes a first light source positioned along the first surface, a second light source positioned along the second surface, a third light source positioned along the third surface, and a fourth light source positioned along the fourth surface.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, various configurations for variable light indicators are shown that may be utilized with one or more gauges and/or independently, according to various exemplary embodiments. The variable light indicators generally include a first light source, such as a light emitting diode (LED), and a second light source, such as a second LED, at different positions on a surface. An intensity of the first light source may be varied from a powered off or minimum intensity to a maximum intensity. Similarly, an intensity of the second light source may be varied from a powered off or minimum intensity to a maximum intensity. The surface may separate the first light source and the second light source. The surface may be, for example, a gauge on an instrument panel of a vehicle.

In some embodiments, the surface may include a white or other reflective portion between the first and second light sources such that light emitted from one or both of the light sources are reflected off the surface. For example, if the first light source is at a first, minimum or powered off intensity and the second light source is also at a first, minimum or powered off intensity, then little or no light may be reflected by the surface. As another example, the first light source may be set to a second, maximum intensity such that a first portion of reflected light from the surface corresponds to the light emitted from the first light source while the second light source is at a first, minimum or powered off intensity. Light reflected from the surface may be brightest substantially near the first light source and diminishes as the distance from the first light source increases, such as over the distance toward the second light source and/or along any other route between the first light source and the second light source.

If the second light source is set to a minimum intensity, a second portion of reflected light from the surface may be light emitted from the second light source. Thus, the light reflected from the surface may include a first, larger portion from the first light source and a second, smaller portion from the second light source when the first light source is at a maximum intensity and the second light source is at a minimum or powered off intensity.

In addition to the first and second portions of the surface, there may also be a region of overlap region where the light from the first light source and the second light source are both reflected by the surface. The overlap region may be positioned between the first portion and the second portion of the surface. If the first light source emits light of a first color and the second light source emits light of a second color, which is different from the first color, the two colors may overlap in an overlap region close to the second light source (if the intensity of the first light source is greater than the intensity of the second light source). Accordingly, the first portion of the surface may have a color associated with the first light source, the second portion may have a color associated with the second light source, and the overlap region may have a color that is a mixture of the colors of the first and second light sources. For example, a red first light source and a blue second light source may result in a red first portion, a blue second portion, and a purple overlap region. Any combination of colors (e.g., yellow, green, orange, white, indigo, violet, etc.) may be used. In some instances, the colors of the first and second light sources may be primary colors such that the overlap region is a secondary color. In other instances, the colors of the first and second light sources may be secondary colors such that the overlap region is a tertiary color. In some other instances, the color of the first light source may be a first color and the color of the second light source may be a second color such that the overlap region is a third color.

As the intensity of the second light source is increased, the overlap region may shift further from the second light source and closer to the first light source. In some instances, the first light source may simultaneously reduce intensity, or may maintain intensity as the intensity of the second light source increases.

In some embodiments, the overlap region may be positioned at a midpoint that is equidistant between the first light source and the second light source. Such a midpoint overlap region may occur when the first light source and the second light source are both at a maximum intensity. In other embodiments, the overlap region may be positioned at a midpoint when the first light source and the second light source are both at an intermediate intensity. The intermediate intensity may be a middle intensity and/or may be any other intensity between the maximum and the minimum and/or the powered off state of the first light source and/or the second light source. It should be understood that in any of the foregoing configurations, the first portion from the first light source and the second portion from the second light source are substantially equal in size and/or intensity with an overlap region disposed between the first portion and the second portion.

The first light source may decrease in intensity to a minimum or powered off intensity while the second light source maintains a maximum intensity and/or increases to a maximum intensity. Thus, the first portion of reflected light from the first light source may decrease in size and/or intensity while the second portion of reflected light from the second may increase in size and/or intensity. Accordingly, the overlap region may move from the midpoint to a region substantially near the first light source. When the first light source is at a minimum or powered off intensity and the second light source is at a maximum intensity, the overlap region may be substantially near the first light source.

Thus, it should be understood that the first light source and the second light source may be varied in intensity such that the overlap region of light reflected by the surface may be moved relative to the first light source and the second light source. Such an overlap region may be used as a visual indicator that may be associated with information to be conveyed to a user. For example, for a speedometer, the overlap region may indicate the current vehicle speed.

The embodiments of the present disclosure describes a variable light indicator for an instrument panel or other vehicle subsystem. In other embodiments, the variable light indicator and lighting systems as described in the present disclosure may be provided for other non-vehicle applications.

Figure 1:
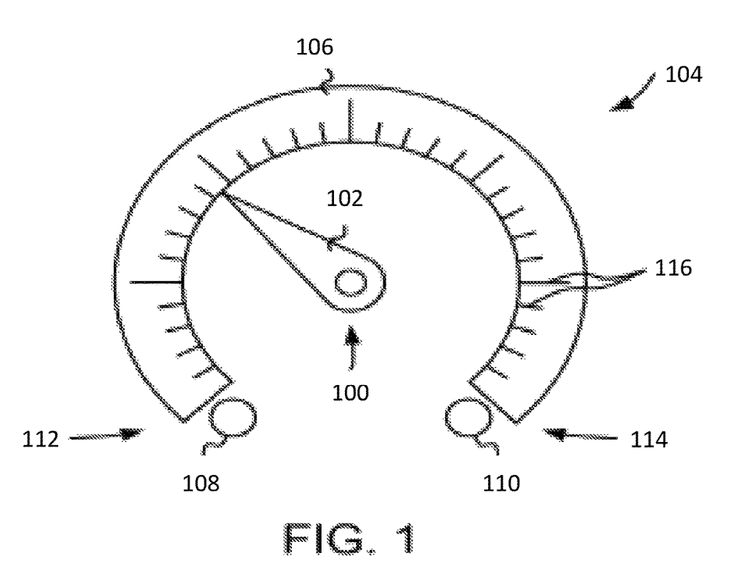
FIG. 1 is an overview of an example arcuate indicator for a gauge, according to an exemplary embodiment.

Referring to FIG. 1, a dial-type gauge 100 including a pointer 102 is shown having an example arcuate indicator assembly 104 disposed about a portion of the circumference of gauge 100. Indicator assembly 104 may generally include a light guide 106 and two light sources 108, 110. First light source 108 is associated with a first end 112 of light guide 106 and second light source 110 is associated with a second end 114 of light guide 106. Light guide 106 may be a light guide including a transparent or semi-transparent member that is capable of transmitting at least some light therethrough. For example, light guide 106 may be made of transparent plastic. In other examples, light guide 106 may be frosted or may have other features. Light guide 106 may optionally further include one or more markings 116. Pointer 102 may be used to convey information to a user depending upon the position of pointer 102 and markings 116. First and second light sources 108, 110 may include light emitting diodes (LEDs) and/or any other light source. In some instances, first and second light sources 108, 110 may have different colored LEDs.

Figure 2A:
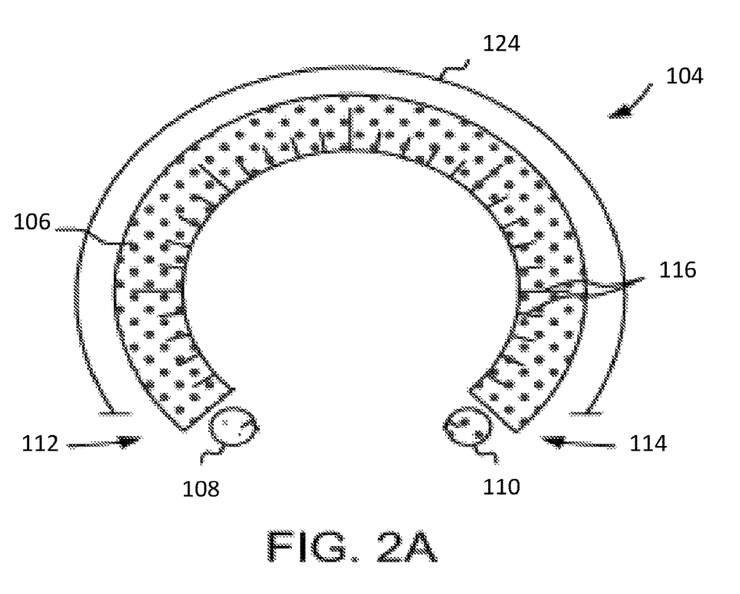
FIG. 2A is an overview of the example arcuate indicator of FIG. 1 showing an overlap region near a first light source, according to an exemplary embodiment.
Figure 2B:
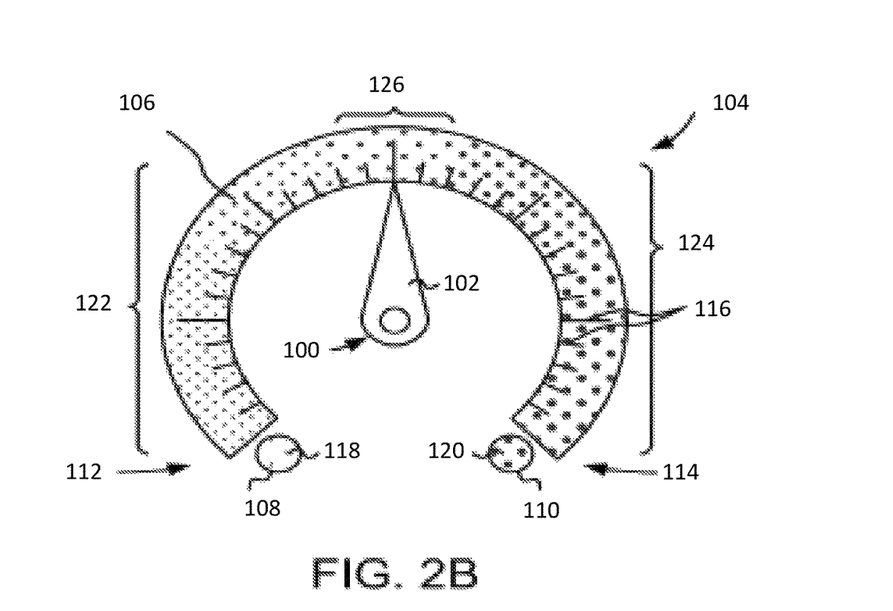
FIG. 2B is an overview of the example arcuate indicator of FIG. 1 showing an overlap region near a midpoint, according to an exemplary embodiment.
Figure 2C:
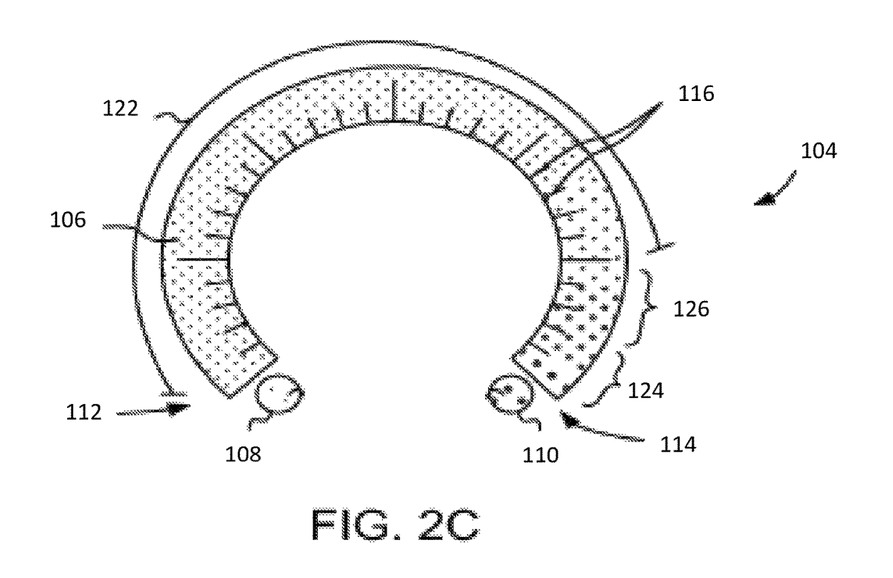
FIG. 2C is an overview of the example arcuate indicator of FIG. 1 showing an overlap region near a second light source, according to an exemplary embodiment.

Referring generally to FIGS. 2A-C, various lighting configurations for gauge 100 are illustrated. Referring to FIG. 2A, pointer 102 of gauge 100 is shown substantially near first light source 108. To provide an alternative visual indication of the position of pointer 102, second light source 110 may be set to a maximum intensity such that a second light color 120 is seen through light guide 104. In instances with a substantially transparent light guide, one or more semi-transparent markings 116 may be provided such that the light from second light source 110 illuminates markings 116 for the user to see. Such markings may reflect light or refract light. Light guide 106 may form an arc of substantially 0 degrees to substantially 360 degrees, an arc of substantially 300 degrees, and/or an arc of substantially 270 degrees. Light guide 106 may include one or more walls, such as walls on the outer and/or inner circumference of light guide 106. Such walls may include reflective portions to keep light within light guide 106.

In the embodiment of FIG. 2A, first light source 108 is powered off, though in some instances, first light source 108 may be set to a minimum intensity such that an overlap region (shown in FIGS. 2B-2C) may be substantially near first light source 108. In the present example, second light color 120 encompasses a second portion or region 124 of the light emitted, which in the present example is substantially all of the light seen.

Referring to FIG. 2B, when pointer 102 of gauge 100 rotates clockwise, first light source 108 may be turned on and increased in intensity such that a first light color 118 is seen associated with a first portion or region 122 of the light emitted trough light guide 106. The intensity of second light source 110 may either remain at a maximum intensity or may be decreased as the intensity of first light source 108 is increased. In some embodiments, an overlap portion or region 126 is formed where the two light sources 108, 110 overlap. In the instance where two different colors 118, 120 are used, the overlap region may be a third color. First light source 108 and second light source 110 may be varied such that overlap region 126 corresponds to a position of pointer 102. Thus, as pointer 102 moves, overlap region 126 provides an additional visual indicator to a user of where pointer 102 is positioned. Thus, it may be easier for a user to determine a status of gauge 100 by the position of the overlap region 126 without determining the position of pointer 102 exactly. In addition, the size and/or intensity of first color 118 and/or second color 120 may provide an indication of the status of gauge 100 as well. In the example of FIG. 2B, first light source 108 and second light source 110 may be both at maximum intensity when pointer 102 of gauge 100 is at a midpoint. In other implementations, first light source 108 and second light source 110 may be at any other intermediate intensity.

Referring to FIG. 2C, as pointer 102 rotates further towards second end 114, first region 122 of light associated with first light source 108 increases and overlap region 126 moves towards second light source 110 while second region 124 of light associated with second light source 110 decreases. It should be understood that first light source 108 and second light source 110 are operable to indicate a position of an indicator relative to overlap region 126. Thus, a user may quickly determine a location of pointer 102 based upon the relative position of overlap region 126 and/or the ratio of first region 122 to second region 124. In some embodiments, pointer 102 may be omitted and indicator assembly 104 may convey information by itself.

Figure 3:
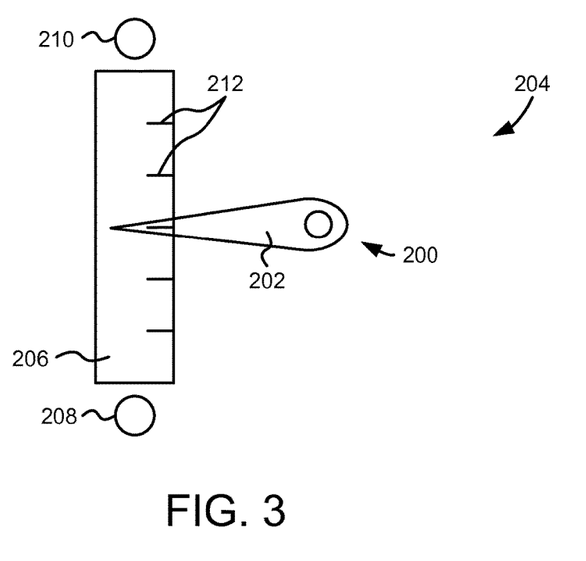
FIG. 3 is an overview of an example linear indicator for a gauge, according to an exemplary embodiment.
Figure 4A:
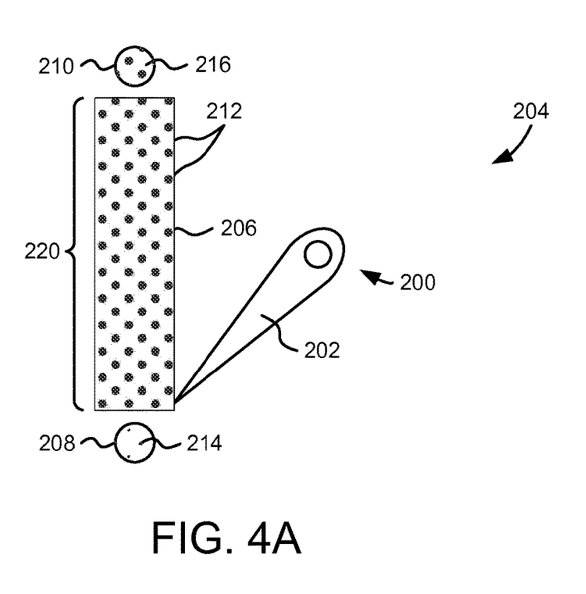
FIG. 4A is an overview of the example linear indicator of FIG. 3 showing an overlap region near a first light source, according to an exemplary embodiment.
Figure 4B:
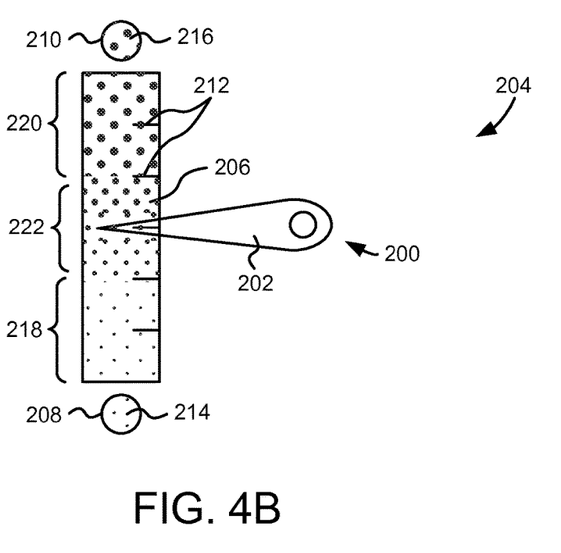
FIG. 4B is an overview of the example linear indicator of FIG. 3 showing an overlap region near a midpoint, according to an exemplary embodiment.
Figure 4C:
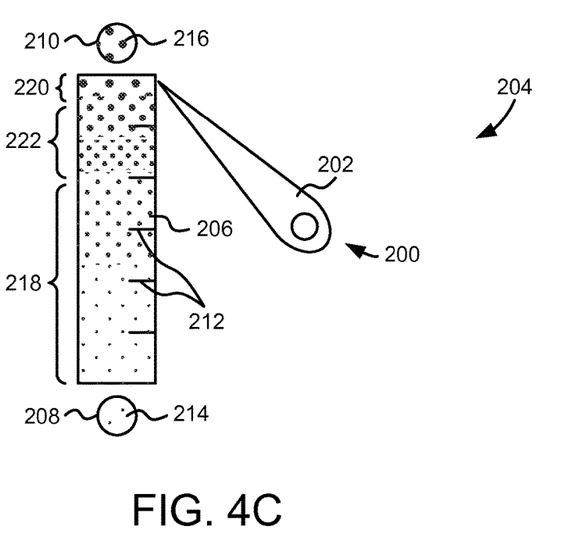
FIG. 4C is an overview of the example linear indicator of FIG. 3 showing an overlap region near a second light source, according to an exemplary embodiment.

FIG. 3 depicts a linear indicator assembly 204 including a gauge 200 having a pointer 202. Linear indicator assembly 204 further includes a light guide 206, a first light source 208 emitting a first light color 214, a second light source 210 emitting a second light color 216, and markings 212 which may have general functionality as described with respect to indicator assembly 104 above. FIGS. 4A-4C depict movement of an overlap region 222 and/or the relative size of a first region 218 and second region 220. The increase and/or decrease in light intensity of first light source 208 and/or second light source 210 may be done in a similar manner to that described with respect to FIGS. 2A-2C. Similarly, in some embodiments pointer 202 may be omitted and indicator assembly 204 may convey information by itself.

Figure 5:
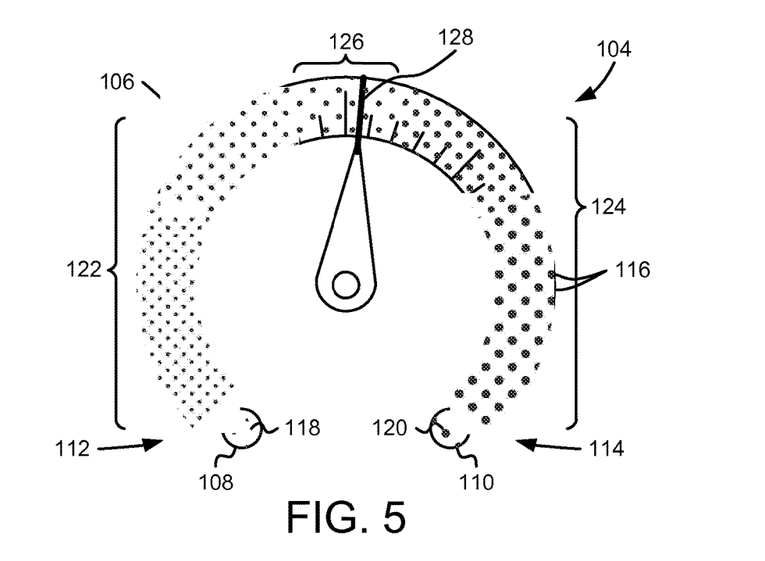
FIG. 5 is an overview of an arcuate indicator and a gauge having a pointer with a tip portion, according to an exemplary embodiment.

FIG. 5 depicts an arcuate indicator assembly 104 and gauge 100 having a pointer 102 that is substantially similar to that shown and described with respect to FIGS. 1-2C. In the embodiment of FIG. 5, pointer 102 includes a tip portion 128 that extends into light guide 106. Tip portion 128 may include a reflective portion sized to substantially block light from overlap region 126 in light guide 106 such that tip portion 128 provides a sharp division between first region 122 and second region 124. In some embodiments, tip portion 128 may only reflect light from one light source. In some embodiments, tip portion 128 may be disassociated from pointer 102 and may move along light guide 106. In still other embodiments, tip portion 128 may include other filters, such as a polarized light filter, an interference filter, an optical filter, and/or any other filter. In still further embodiments, tip portion 128 may reflect light or refract light.

Figure 6:
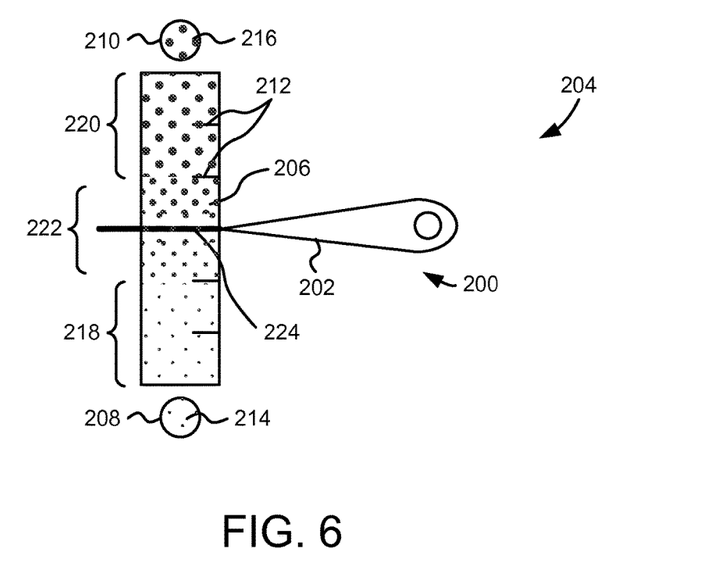
FIG. 6 is an overview of a linear indicator and a gauge having a pointer with a tip portion, according to an exemplary embodiment.

FIG. 6 depicts a linear indicator assembly 204 that may be constructed in a similar manner to arcuate indicator assembly 104 of FIG. 5. Pointer 202 include tip portion 224 that extends into light guide 206 in a similar manner to tip portion 128 of FIG. 5.

Figure 7:
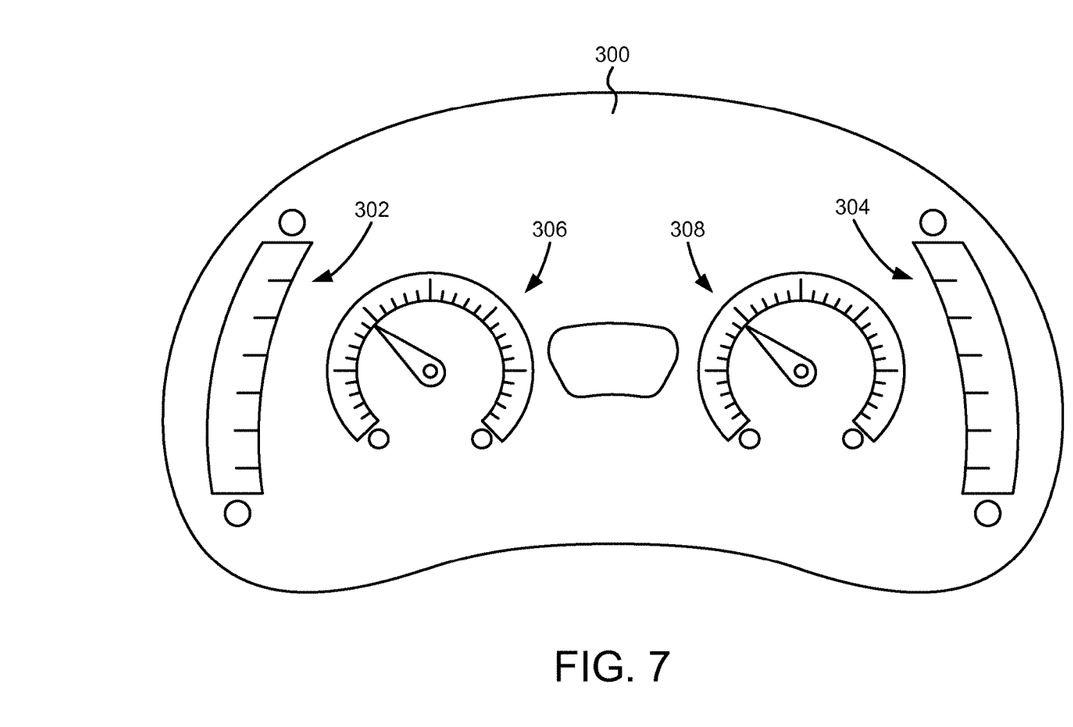
FIG. 7 is an overview of an example instrument cluster having a plurality of indicators disposed on the instrument cluster, according to an exemplary embodiment.

FIG. 7 depicts an example instrument cluster 300 of a vehicle having a pair of indicator assemblies 302, 304 on the wings of cluster 300 and a pair of indicator assemblies 306, 308 each disposed about a dial-type gauge. In the present example, indicator assemblies 302, 304 on the wings of cluster 300 are not associated with any gauge or pointers. Thus, for indicator assemblies 302, 304, the overlap region between the two light sources provides the user with information based on the relative position of the overlap region. In some embodiments, the overlap region may provide a pulsing motion by travelling from the bottom light source up to the top light source, then starting back at the bottom light source and moving back up again (e.g., such as to provide an indication of charging or otherwise). In some embodiments, the speed of the pulsing, intensity, and/or other characteristic may be used to convey additional information (e.g., a charging rate, download rate, etc.) In other embodiments, the overlap region may oscillate between the two light sources. Thus, the perception of motion of the overlap region may be used to convey information. In still further embodiments, the overlap region may move from one light source to the other (e.g., such as to provide an indication of a fuel level, battery power, connection strength, miles until fuel tank is empty, oil cleanliness or dirtiness, glow plug charging state, tire pressure, fuel pressure, etc.). Indicator assemblies 302-308 may be horizontally disposed and/or disposed at any angle from 0 degrees, inclusive, to 360 degrees, inclusive.

Figure 8:
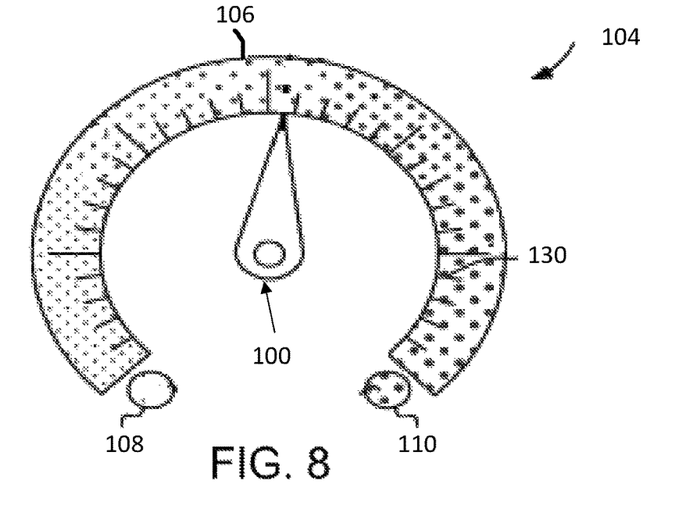
FIG. 8 is an overview of an example arcuate indicator having a recessed surface, according to an exemplary embodiment.
Figure 9:
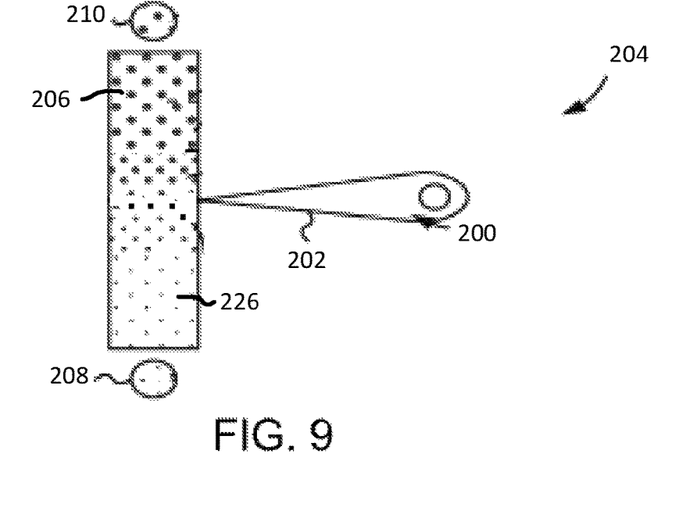
FIG. 9 is an overview of an example linear indicator having a recessed surface, according to an exemplary embodiment.

Referring to FIGS. 8-9, arcuate indicator assembly 104 and linear indicator assembly 204 are shown emitting light in another pattern in light guide 106, 206, respectively. In the embodiment of FIGS. 8-9, a channel or recess is formed such that light from light sources 108, 110 or 208, 210 may travel within the channel to provide a visual indication to the user. A recessed portion 130 of light guide 106 and recessed portion 226 of light guide 206 in FIGS. 8-9 are illustrated that provide a visual indication to the user. The channel may include a transparent cover, though this is optional. In further embodiments, the light sources may simply be disposed at different points on a surface without a light guide or recess.

By way of example only, one or more of the foregoing indicator assemblies may be used to provide a user with information indicative of a rotation rate, a speed rate, a tachometer, a speedometer, a downloading rate, an upload rate, a signal strength, a charging rate, a charging status, a fuel level, a fuel consumption rate, a fuel efficiency, a temperature, an air conditioner temperature setting, a fan speed, a transmission temperature, a battery charging rate, a battery discharging rate, a battery charge level, a tire pressure, a tire temperature, an oil level, an oil temperature, an oil purity, a temperature of a glow plug, an engine temperature, a differential temperature, a seat temperature, a cruise control speed, an acceleration rate, an adaptive cruise control speed, a traction control status, a differential status, a shift efficiency, a door status, a door position, a gas door position, a window status, a window position, a moon roof status, a moon roof position, a convertible top status, a convertible top position, a lift gate status, a lift gate position, a washer fluid level, a transmission fluid level, a distance-to-empty, an incline position, an incline rate of change, a body roll rate, a body roll position, a lateral acceleration, a turbo temperature, a turbo pressure, a turbo speed, a turbo boost, a radio station, a preset, a balance, a vent position, a distance to an object, a back up sensor indicator, a blind spot indicator, a lane departure indicator, a Bluetooth® status, a Bluetooth® signal strength, a cupholder temperature, a cupholder temperature setting, a compartment temperature, a compartment temperature setting, a windshield wiper rate, a sideview mirror position, a parking brake status, a brake temperature, a brake disc status, a tire wear status, a compass direction, a headlight status, a blinker status, a trunk position, a hood position, an air recycle status, a time, a sun position, a navigation indicator, a media item status, a media selection, a brake rate, a volume, a fuel filter status, an oil filter status, an air filter status, a brake fluid status, a brake fluid temperature, a supercharger status, a supercharger boost, a compression ratio, a spring damper status, a radiator fluid level, an ignition timing, a fuel-air mixture, a light intensity, a transmission gear, a clutch position, a clutch wear status, a lap time, a relative time, a heart rate, a breathing rate, a body temperature, a button selection, a training status, an exterior noise level, a propeller pitch, a propeller speed, an altitude, a control surface position, a rate of climb, and a rate of descent.

Further, in one embodiment, the indicator assemblies described herein may be used to illustrate fuel efficiency or other efficiency measures of the vehicle. For example, an indicator assembly may be a linear indicator assembly located on the top of an instrument panel (or elsewhere), with a blue first light source and green second light source. An overlap portion may be displayed to a user that indicates the current efficiency of the vehicle that is a mixture of green and blue, with a blue first portion and green second portion. The color and overlap portion may change based on how efficiently the vehicle is being driven or operated.

In some versions, more than two light sources may be used. For example, 3, 4, 5, and/or more light sources may be included. Furthermore, while the foregoing examples described arcuate and linear indicator assemblies, other indicator assemblies may be used as well. For example, such indicator assemblies may include triangular indicator assemblies having three light sources, square indicator assemblies having four light sources, T-shaped indicator assemblies having three light sources, cross-shaped indicator assemblies having four light sources, and/or other indicator assembly geometries and combinations of light sources.

The light sources may generally be controlled by a microcontroller, a computer, a signal from the vehicle, and or otherwise. For example, referring now to FIG. 10, a block diagram of a lighting control system 400 for controlling the light sources is shown, according to an exemplary embodiment. Lighting control system may generally be configured to control one or more variable light indicators for a vehicle or particular subsystem of the vehicle. For example, lighting control system 400 may control all variable light indicators in a vehicle, all variable light indicators of an instrument panel of the vehicle, etc.

Figure 10:
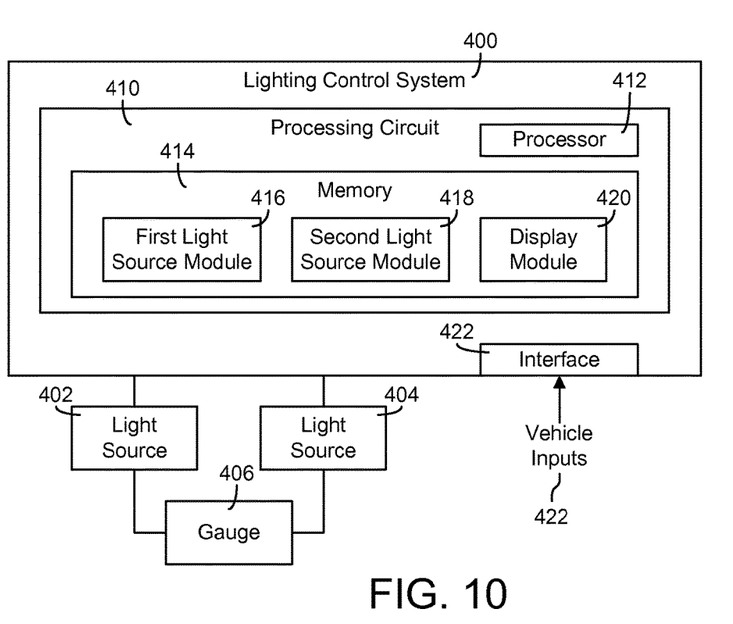
FIG. 10 is a block diagram of a lighting control system configured to illuminate one or more gauges or pointers of an instrument panel, according to an exemplary embodiment.

Lighting control system 400 may generally include a processing circuit 410 including a processor 412 and memory 414. Processor 412 may be implemented as a general purpose processor, an application specific integrated circuit (ASIC), one or more field programmable gate arrays (FPGAs), a group of processing components, or other suitable electronic processing components. Memory 414 may be one or more devices (e.g., ROM, RAM, flash memory, hard disk storage, etc.) for storing data and/or computer code for completing and/or facilitating the various processes described herein. Memory 414 may be or include volatile or non-volatile memory. Memory 414 may include database components, object code components, script components, or any other type of information structure for supporting the various activities described herein. Memory 414 is communicably connected to processor 412 and includes computer code for executing the processes described herein.

Lighting control system 400 may be coupled to a plurality of light sources 402, 404. Light sources 402, 404 may be positioned near a gauge 406 or other visual indicator. For example, light source 402 may be positioned in a first position along the surface of gauge 406 and light source 404 may be positioned in a second position along the surface of gauge 406. The first position and second position may correspond with the two ends of the gauge, according to an exemplary embodiment. The positions may generally define a region of gauge 406. The region may be an arcuate region, linear region, or any other shape that corresponds with gauge 406. The position of light sources 402, 404 may be opposite one another on gauge 406, or may be positioned otherwise along the gauge. Any number of light sources may be positioned along gauge 406. As noted above, lighting control system 400 may further be coupled to more light sources for other gauges; a pair of light sources 402 for a single gauge 404 is shown as an example only.

Each light source 402, 404 may be a single color or a pattern of colors. For example, light source 402 may be a green color and light source 404 a red color opposing each other in a gauge. The colors of each light source 402, 404 may be set up such that the color between the light sources may be mixed in an overlap region in a particular way. For example, the colors of two light sources 402, 404 may be chosen such that a third color formed in an overlap region of the gauge is a secondary color, a tertiary color, or simply a different color from the first two colors.

Memory 414 is shown to include a first light source module 416 and second light source module 418 configured to control light sources 402, 404, respectively. In one embodiment, light source modules 416, 418 may control the intensity of the light emitted by light sources 402, 404. For example, light source modules 416, 418 may turn a light source off or may set an intensity of a light source to a minimum, intermediate, or maximum intensity. By setting an intensity of light sources 402, 404, light source modules 416, 418 may control a size of a first portion of the gauge illuminated by light source 402 and a size of the second portion of the gauge illuminated by light source 404. Light source modules 416, 418 may further control a color emitted by light sources 402, 404, a pattern of light, or any other light source property. Light source modules 416, 418 may receive a desired intensity level for each light source from display module 420 as described below.

Memory 414 further includes a display module 420. Display module 420 may be configured to determine a desired intensity level for light sources 402, 404. By determining a desired intensity level, display module 420 may generate an overlap region to be displayed on gauge 406. For example, assume that gauge 406 is a vehicle speed gauge. Display module 420 may receive a vehicle input 422 relating to a pointer position on gauge 406, along with the current vehicle speed. Display module 420 may determine an intensity for light sources 402, 404 that creates an overlap region around the current vehicle speed as indicated by the pointer. The overlap region may be configured to indicate the position of the pointer more clearly to a user.

In one embodiment, instead of an overlap region defining the position of the pointer, the first region or second region (corresponding with light sources 402, 404 respectively) may be used to define the position of the pointer. Display module 420 may be configured to adjust the intensity of light sources 402, 404 to associate one of the first region and second region with the position of the pointer.

In one embodiment, display module 420 may create the overlap region by setting one of light sources 402, 404 to an off or minimum intensity setting, and adjusting the intensity of the other light source to an appropriate level. In another embodiment, display module 420 may set one of light sources 402, 404 to a maximum intensity settings, and adjust the intensity of the other light source to an appropriate level. In yet another embodiment, display module 420 may set both light sources 402, 404 to different intermediate intensity settings, and adjust the intensity of both light sources accordingly. If first light source 402 is set to a maximum intensity and second light source 404 to a minimum intensity, the overlap region may appear substantially close to second light source 404, near one end of the gauge. Similarly, if first light source 402 is set to a minimum intensity and second light source 404 to a maximum intensity, the overlap region may appear substantially close to first light source 402. If both light sources 402, 404 are set to a maximum intensity or to an equal intermediate intensity, the overlap region may appear equidistant between the two light sources.

In one embodiment, display module 420 may be configured to determine a ratio. The ratio may be associated with a status, position, setting, or characteristic of an object. Characteristics may include a temperature, speed, acceleration, rotation rate, pressure, size, weight, liquid volume, rate, selection, audible volume, etc. The ratio may be used to determine an intensity of light sources 402, 404 such that a size of the first region and size of the second region correspond with the ratio.

In one embodiment, the pointer or gauge 406 may include a tip portion. The tip portion may reflect or refract light from one or both of light sources 402, 404. Display module 420 may be configured to adjust the intensity of light sources 402, 404 to account for the tip portion of the pointer or gauge 406.

In one embodiment, gauge 406 may include one or more indicators (e.g., markings as described above). Display module 420 may be configured to adjust the intensity of light sources 402, 404 such that light source 402 illuminates a first set of indicators, light source 404 illuminates a second set of indicators, and both light sources 402, 404 illuminate a third set of indicators (e.g., indicators that would indicate a current value on gauge 406).

In one embodiment, there may be a third light source coupled to gauge 406, and memory 414 may include a third light source module to control the intensity of the third light source. Two of the three light sources may be positioned along a first surface of a gauge, and the third light source may be positioned along the second surface of the gauge. The second surface may intersect with the first surface The first two light sources may be positioned at opposite ends of the first surface, and the third light source may be positioned near the end of the second surface opposing the intersection. Such a configuration may form, for example, a T-shape. Display module 420 may be configured to determine an intensity level for all three light sources.

In one embodiment, there may be a third and fourth light source coupled to gauge 406, and memory 414 may include a third and fourth light source module to control the intensity of the third and fourth light source, respectively. The gauge may include two surfaces, each surface having two light sources positioned at opposite ends of the surfaces. Such a configuration may form, for example, a cross-shape. Display module 420 may be configured to determine an intensity level for all four light sources.

In one embodiment, gauge 406 may be a triangular shape, including three surfaces. Lighting control system 400 may be coupled to three light sources positioned at the three intersections of the three surfaces. In another embodiment, gauge 406 may be in a planar square shape, including four surfaces. Lighting control system 400 may be coupled to four light sources positioned at the four intersections of the four surfaces.

Lighting control system 400 is shown to include an interface 424 for receiving vehicle inputs 422 for use by display module 420. Interface 424 may receive vehicle inputs 422 from a plurality of vehicle subsystems via a wired or wireless connection.

Figure 11:
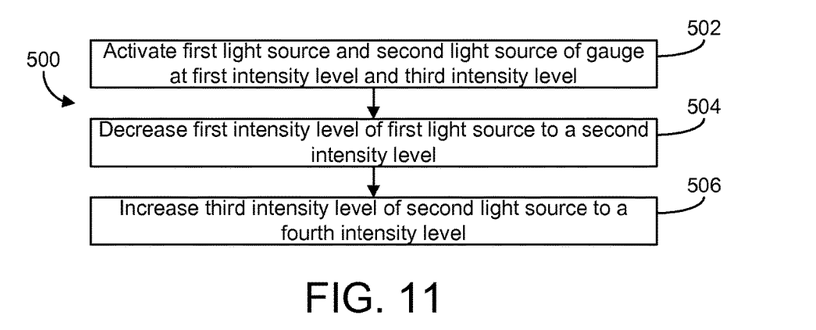
FIG. 11 is a flow chart of a process for illuminating a gauge of an instrument panel.

Referring now to FIG. 11, a flow chart of a process 500 of illuminating a gauge of an instrument panel is shown, according to an exemplary embodiment. Process 500 may be executed by, for example, lighting control system 400. In the embodiment of FIG. 5, process 500 is described for a gauge with two light sources.

Process 500 includes activating the first light source and second light source at a first intensity level and third intensity level, respectively (step 502). The intensity levels may be determined by, for example, display module 420 in response to a particular vehicle input. The intensity levels may be used to create an overlap region on the gauge as described above.

Process 500 further includes decreasing the first intensity level of the first light source to a second intensity level (step 504) and increasing the third intensity level of the second light source to a fourth intensity level (step 506). By decreasing the first intensity level of the first light source, less light is provided by the first light source. By increasing the third intensity level of the second light source, more light is provided by the second light source. This may result in the overlap region moving closer towards the second light source. The second light source may be located at a second end of the gauge (e.g., upper end) which corresponds with a higher vehicle speed, for example. While process 500 describes changing intensity levels to move the overlap region in one direction, it should be understood that process 500 may be modified (e.g., the intensity levels may be changed in any way) to cause the overlap region to move in any direction.

In one embodiment, steps 504, 506 may be executed based on a change of position of a pointer or other indicator of the gauge. In another embodiment, steps 504, 506 may be executed based on a change of a vehicle input (e.g., an increase in vehicle speed) if there is no pointer.

According to an exemplary embodiment, the systems and methods disclosed herein may include an indicator for an economy mode of a vehicle. As fuel economy is improved, for example, the gauge can turn more green. As fuel economy is decreased, for example, the gauge can turn more blue. This may be used in a hybrid vehicle, an EV vehicle (to gauge effiency, not relating to fuel), a vehicle with a regenerative braking system, etc.

In various embodiments, the intensity levels may each be a maximum intensity level, minimum intensity level, or any intermediate intensity level. Further, the change in intensity levels may be slow or rapid. For example, process 500 may be configured to rapidly increase the intensity level of the first light source from a first minimum intensity level to a second maximum intensity level in response to a change in pointer position. The light color of the first and second light sources may be different and may be chosen such that a third color may be formed in the overlap region.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

What is claimed is:

1. An apparatus for visual indication comprising:
a gauge including a surface;
a first light source positioned along the surface at a first location to illuminate a first portion of the surface, wherein the first light source has a first light color;
a second light source positioned along the surface at a second location to illuminate a second portion of the surface, wherein the second light source has a second light color; and
a processing circuit configured to:
receive a vehicle input relating to a position of a pointer of the gauge adjacent to the surface;
determine intensity levels for the first light source and the second light source to indicate the position of the pointer such that an overlap region defined by the first portion and the second portion aligns with the position of the pointer, the overlap region defined based on the intensity levels of the first light source and second light source and having at least one of (i) an intensity level different from at least one of an intensity level of the first light source or an intensity level of the second light source or (ii) a color different from at least one of the first light color or the second light color; and
activate the first light source at a first intensity level and the second light source at a third intensity level based on the determination of the intensity levels of the first light source and the second light source; and
in response to a movement of the indicator as determined based on the vehicle input, (i) decrease a first intensity of the first light source from the first intensity level to a second intensity level; and (ii) increase a second intensity of the second light source from the third intensity level to a fourth intensity level.

2. The apparatus of claim 1, wherein the second location is different from the first location.

3. The apparatus of claim 1, wherein the first light color and the second light color are different.

4. The apparatus of claim 3, wherein the overlap region is defined by a third light color, wherein the third light color is a secondary color of the first light color and the second light color.

5. The apparatus of claim 3, wherein the overlap region is defined by a third light color, wherein the third light color is a tertiary color of the first light color and the second light color.

6. The apparatus of claim 3, wherein the overlap region is defined by a third light color, wherein the third light color is different than the first light color and the second light color.

7. The apparatus of claim 3, wherein overlap region is located substantially near the second light source, wherein the first intensity is a maximum for the first light source, wherein the second intensity is a minimum for the second light source.

8. The apparatus of claim 3, wherein the overlap region is located substantially near the first light source, wherein the first intensity is a minimum for the first light source, wherein the second intensity is a maximum for the second light source.

9. The apparatus of claim 3, wherein the overlap region is located substantially equidistant between the first light source and the second light source, wherein the first intensity is a maximum for the first light source, wherein the second intensity is a maximum for the second light source.

10. The apparatus of claim 3, wherein the overlap region is located substantially equidistant between the first light source and the second light source, wherein the first intensity is at an intermediate level for the first light source, wherein the second intensity is at an intermediate level for the second light source.

11. The apparatus of claim 3, wherein the first location defines a first end of a region of the surface, and wherein the second location defines a second end of the region of the surface.

12. The apparatus of claim 11, wherein in the region comprises an arcuate portion.

13. The apparatus of claim 12, wherein the arcuate portion comprises an arc of substantially 0 degrees to substantially 360 degrees.

14. The apparatus of claim 12, wherein the arcuate portion comprises an arc of substantially 300 degrees.

15. The apparatus of claim 12, wherein the arcuate portion comprises an arc of substantially 270 degrees.

16. The apparatus of claim 12, wherein the region comprises a channel formed in the surface.

17. The apparatus of claim 12, wherein the region comprises one or more walls extending from the surface.

18. The apparatus of claim 11, wherein the region comprises a linear portion.

19. The apparatus of claim 18, wherein the region comprises a channel formed in the surface.

20. The apparatus of claim 18, wherein the region comprises one or more walls extending from the surface.

21. The apparatus of claim 11, wherein the first end of the region is associated with a first end position of the pointer, and wherein the second end of the region is associated with a second end position of the pointer.

22. The apparatus of claim 11, wherein the region comprises one or more markings, wherein the one or more markings is associated with the pointer.

23. The apparatus of claim 22, wherein the one or more markings are operable to refract light.

24. The apparatus of claim 22, wherein the one or more markings are operable to reflect light.

25. The apparatus of claim 11, wherein the first light source and the second light source are operable to indicate the position of the pointer relative to the region.

26. The apparatus of claim 3, wherein the pointer includes a tip portion, wherein the tip portion is operable to reflect light from the first light source or the second light source.

27. The apparatus of claim 3, wherein the pointer includes a tip portion, wherein the tip portion is operable to reflect light from the first light source and the second light source.

28. The apparatus of claim 3, wherein the pointer includes a tip portion, wherein the tip portion comprises a filter.

29. The apparatus of claim 28, wherein the filter is an optical filter.

30. The apparatus of claim 28, wherein the filter is a polarized light filter.

31. The apparatus of claim 28, wherein the filter is an interference filter.

32. The apparatus of claim 3, wherein the pointer includes a tip portion, wherein the tip portion is operable to refract light.

33. The apparatus of claim 3, wherein the pointer includes a tip portion, wherein the tip portion is operable to reflect light.

34. The apparatus of claim 1, wherein the first location and the second location define a region of the surface.

35. The apparatus of claim 1, wherein in the surface comprises an arcuate portion.

36. The apparatus of claim 1, wherein the surface comprises a linear portion.

37. The apparatus of claim 1, wherein the first location is associated with a first position of the pointer.

38. The apparatus of claim 1, wherein the second location is associated with a second position of the pointer.

39. The apparatus of claim 1, wherein the surface is associated with the pointer.

40. A method of visual indication using a system comprising a gauge including a surface, a first light source associated with a first portion of the surface, and a second light source associated with a second portion of the surface, wherein the first light source has a first light color, and wherein the second light source has a second light color, the method comprising:

receiving a vehicle input relating to a position of an indicator adjacent to the surface;

determining intensity levels for the first light source and the second light source to indicate the position of the indicator such that an overlap region defined by the first portion and the second portion aligns with the position of the indicator, the overlap region defined based on the intensity levels of the first light source and second light source and having at least one of (i) an intensity level different from at least one of an intensity level of the first light source or an intensity level of the second light source or (ii) a color different from at least one of the first light color or the second light color; and activating the first light source at a first intensity level and the second light source at a third intensity level based on the determination of the intensity levels of the first light source and the second light source; and in response to a movement of the indicator as determined based on the vehicle input, (i) decreasing a first intensity of the first light source from the first intensity level to a second intensity level; and (ii) increasing a second intensity of the second light source from the third intensity level to a fourth intensity level.

41. The method of claim 40, wherein the first intensity level is a maximum intensity level for the first light source, and wherein the second intensity level is a minimum intensity level for the first light source.

42. The method of claim 40, wherein the third intensity level is a minimum intensity level for the second light source, and wherein the fourth intensity level is a maximum intensity level for the second light source.

43. The method of claim 40, wherein the first light color and the second light color are different.

44. The method of claim 43, wherein the overlap region is defined by a third light color, wherein the third light color is different than the first light color and the second light color.

* * * * *